United States Patent [19]
Putnin et al.

[11] 3,860,626
[45] Jan. 14, 1975

[54] METHODS FOR THE PREPARATION OF BOROTRIHYDROXYGLUTARATE

[75] Inventors: Aina Yanovna Putnin; Evgenia Mikhailovna Shvarts; Nina Avgustovna Ermush; Alfred Fritsevich Ievinsh; Arvid Yanovich Kalninsh, all of Riga, U.S.S.R.

[73] Assignee: Institut Neorganicheskoi Khimii, Riga, U.S.S.R.

[22] Filed: July 25, 1968

[21] Appl. No.: 747,475

[30] Foreign Application Priority Data
July 26, 1967 U.S.S.R............... 1174906

[52] U.S. Cl..................... 260/462 R, 424/185, 21/7
[51] Int. Cl............................... C07f 5/04
[58] Field of Search..................... 260/462, 462 R

[56] References Cited
UNITED STATES PATENTS
1,859,653  5/1932  Craver et al.............. 260/462

OTHER PUBLICATIONS
Organoboron Chemistry, H. Steinberg, N.Y. (1964), pp. 736, 737, 738, 758, 759.
Chemical Abstracts, 35, 3186, (1941).
Chemical Abstracts, 64, 8991b, (1966).
Y. Tsuzuki, The Nature of Complex Formation Between Boric Acid and Organic Polyoxy Compounds, Bull. Chem. Soc. Jap. 16, 23–31, (1941).

Primary Examiner—Leon Zitver
Assistant Examiner—Norman Morgenstern
Attorney, Agent, or Firm—Waters, Roditi, Schwartz, & Nissen

[57] ABSTRACT

A method of producing sodium borotrihydroxyglutarate in the form of non-toxic crystals comprising reacting in an aqueous medium trihydroxyglutaric acid and sodium borate of the general formula $nNa_2O \cdot mB_2O_3 \cdot xH_2O$, wherein n = 1 to 2, m = 1 to 5, and x = 0 to 10. The sodium borate is prepared directly in the reaction mixture by causing boric acid and sodium hydroxide to interact. The trihydroxyglutaric acid, boric acid and sodium hydroxide are taken in a molar ratio of about 1.1 : 1 : 2. In lieu of trihydroxyglutaric acid, zylotrihydroxyglutaric acid can bae utilized.

4 Claims, No Drawings

METHODS FOR THE PREPARATION OF BOROTRIHYDROXYGLUTARATE

This invention relates to methods for the preparation of boron compounds and, more particularly, to the methods of preparing sodium borotrihydroxyglutarate which finds application as an effective wood antiseptic.

It is known to produce sodium borotrihydroxyglutarate ($2Na_2O \cdot B_2O_3 \cdot 2C_5H_6O_6 \cdot 3H_2O$) represented by the structural formula (1) by a method comprising reacting borax and boric acid to obtain crystalline sodium pentaborate ($NaB_5O_8 \cdot 5H_2O$), preparing separately crystalline sodium hydrogen trihydroxyglutarate ($NaHC_5H_6O_7 \cdot H_2O$) from sodium trihydroxyglutarate and trihydroxyglutaric acid, followed by carrying out the reaction between the thus prepared sodium pentaborate and sodium hydrogen trihydroxyglutarate in an aqueous medium, which reaction yields the target product

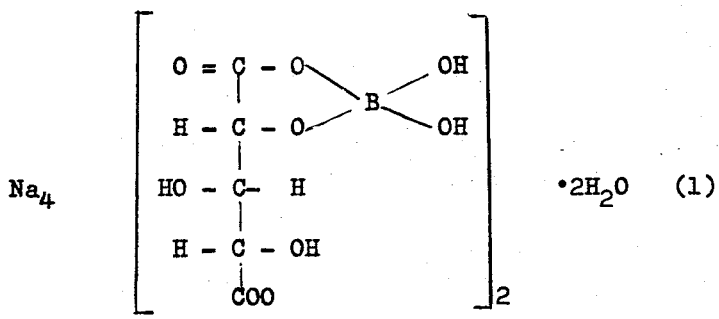

The known method suffers from the drawback of being a multistage process, an added difficulty being associated with the fact that the step of sodium hydrogen trihydroxyglutarate preparation is an intricate procedure, insofar as the precipitation of this compound calls for high accuracy of batching the components and maintaining the requisite pH. Moreover, the target product prepared in accordance with the known method is contaminated with admixtures of boric acid and borates which exhibit marked toxicity towards humans and animals, so that the product in question is hardly suitable for use as a conserving agent for foodstuff package. The aforesaid admixtures contain a significant proportion of crystallization water; the partial removal of said water during treating of articles affects adversely their quality.

It is an object of the present invention to provide a single-stage method for the production of sodium borotrihydroxyglutarate.

It is another object of the present invention to prepare sodium borotrihydroxyglutarate from readily available and cheap raw materials.

It is a further object of the present invention to prepare sodium borotrihydroxyglutarate noted for its improved quality characteristics.

These and other objects have been accomplished by the provision of a method for preparing sodium borotrihydroxyglutarate which, according to the invention, comprises reacting in an aqueous medium trihydroxyglutaric acid and sodium borate of the general formula $nNa_2O \cdot mB_2O_5 \cdot xH_2O$, wherein $n = 1-2$, $m = 1-5$, and $x = 0-10$.

In another embodiment of the present method, the aforesaid sodium borate is prepared directly in the reaction mixture as a result of interaction between boric acid and sodium hydroxide.

It is expedient to take trihydroxyglutaric acid, boric acid and sodium hydroxide in a molar ratio of $\approx 1.1 : 1 : 2$.

The trihydroxyglutaric acid should preferably be used in the form of xylotrihydroxyglutaric acid, since in this case the hydroxyl group at the three carbon atom exerts a less pronounced effect on the interaction between boron and the hydroxyl groups at the one and two carbon atoms, thereby favouring the formation of a complex compound.

It is likewise practicable to employ other derivatives of trihydroxyglutaric acid, such as arabotrihydroxyglutaric or ribotrihydroxyglutaric acid.

The present invention makes it possible to produce sodium trihydroxyglutarate from readily available commercial raw materials by simple single-stage manufacturing process.

The end product obtained in accordance with the present method is free from impurities which are toxic towards man and animals, its $LD_{50}$ being 11 grams per kg. of body weight, so that its toxicity is comparable with that of table salt and the product in question is suitable for food package conservation applications.

The present product is noted for its high quality characteristics and can be used to advantage as a water-soluble antiseptic for treating wooden elements of diverse instruments and apparatus.

The employment of sodium trihydroxyglutarate, prepared in accordance with the method of the invention, for wood impregnation does not affect adversely the quality of varnish coatings on and strength characteristics of the wood, and causes no wood staining or metal corrosion, an added advantage being that the impregnated articles retain their initial appearance.

When the compound, prepared in accordance with the method of the invention, is present in the wood to the extent of about 0.22 percent by weight, there occurs complete inhibition of the growth of *Poria vaporaria, Merulius lakrimaus, Coniophora cerebella, Fomes rozeus, Lentinus squamosus, Lenzites sepiaria*, as well as of wood-attacking and wood-staining fungi, such as *Aspergillus niger*, etc., which are common in tropical climatic zones.

Sodium borotrihydroxyglutarate, prepared according to the present method, lends itself to impregnation applications by the autoclaving, hot-cold bath, spraying and diffusion techniques, etc.

For a better understanding of the present invention given hereinbelow is the example of an embodiment of the method.

EXAMPLE 1

Into 50 ml of water are added 12.4 g. of boric acid, 58.4 g. of trihydroxyglutaric acid and 16 g. of sodium hydroxide, the order in which the reactants are introduced being irrelevant. There takes place a vigorous reaction which results in the formation of a syrupy liquid. The solution is stirred vigorously until there appears a copious precipitate of rhombic crystals of sodium borotrihydroxyglutarate and the reaction mixtures turns into a thick mass having a pH of 4. The overall reaction takes 2–3 days, but the reaction period may be reduced by introducing seed crystals. The course of the reaction is checked microscopically by observing the formation of rhombic crystals in reaction mixture specimens. Upon reaction termination, the rhombic crystals are filtered off and dried at 30°–35°C, whilst the filtrate is recycled for use in the subsequent synthesis. The yield is 29.5 g. (51% of the theoretical amount).

Sodium borotrihydroxyglutarate forms white rhombic plates; $d_{25} = 1.67$ g/cu.cm; solubility in water, 31.8 wt. percent at 25°C. In saturated solutions, the pH equals 4.

It should be borne in mind that the aforesaid example discloses the preferred embodiment of the present method, but various modifications and alterations may be practised, e.g. it is feasible to change the order in which the reactants are added, to substitute sodium borates for boric acid, etc.

The present method is likewise suitable for preparing the borotrihydroxyglutarates of other alkali metals.

We claim:

1. A method for producing non-toxic crystals of sodium borotrihydroxyglutarate which comprises mixing trihydroxyglutaric acid, boric acid and sodium hydroxide in the molar ratio of about 1.1 : 1 : 2 in sufficient water to form a syrupy liquid, stirring the liquid mixture for 2 to 3 days until crystals form, filtering and drying the crystals.

2. A method as claimed in claim 1 wherein the trihydroxyglutaric acid is in the form of its xylotrihydroxyglutaric acid isomer.

3. A method as claimed in claim 1 wherein seed crystals are added to the mixture to shorten the period of crystal formation.

4. A method as claimed in claim 1 wherein the reaction mixture has a pH of 4.

* * * * *